United States Patent
Doty

(10) Patent No.: US 6,727,504 B1
(45) Date of Patent: Apr. 27, 2004

(54) BORON NITRIDE SOLID STATE NEUTRON DETECTOR

(75) Inventor: F. Patrick Doty, Livermore, CA (US)

(73) Assignee: Sandia National Laboratories, Livermore, CA (US)

( * ) Notice: Subject to any disclaimer, the term of this patent is extended or adjusted under 35 U.S.C. 154(b) by 239 days.

(21) Appl. No.: 09/967,143

(22) Filed: Sep. 28, 2001

(51) Int. Cl.⁷ ................................................ G01T 3/00
(52) U.S. Cl. ................................................ 250/390.01
(58) Field of Search ................................... 250/390.01

(56) References Cited

U.S. PATENT DOCUMENTS 3,887,807 A * 6/1975 Poignant et al. ....... 250/390.02
4,419,578 A * 12/1983 Kress ..................... 250/390.01
5,002,720 A * 3/1991 Berggren ................ 250/390.01
5,334,840 A * 8/1994 Newacheck et al. ... 250/390.01
5,399,863 A * 3/1995 Carron et al. .......... 250/390.01

OTHER PUBLICATIONS

A. W. Moore and S.L. Strong, "*Variations in the Structure and Morphology of Pyrolytic Boron Nitride*" Ceramic Engineering Science Proceedings, vol. 10 (7–8), pp. 846–859, (1989).

* cited by examiner

Primary Examiner—Constantine Hannaher
(74) Attorney, Agent, or Firm—Donald A. Nissen

(57) ABSTRACT

The present invention describes an apparatus useful for detecting neutrons, and particularly for detecting thermal neutrons, while remaining insensitive to gamma radiation. Neutrons are detected by direct measurement of current pulses produced by an interaction of the neutrons with hexagonal pyrolytic boron nitride.

10 Claims, 6 Drawing Sheets

BORON NITRIDE SOLID STATE NEUTRON DETECTOR

STATEMENT OF GOVERNMENT INTEREST

This invention was made with Government support under contract no. DE-AC04-94AL85000 awarded by the U.S. Department of Energy to Sandia Corporation. The Government has certain rights in the invention.

BACKGROUND OF THE INVENTION

The invention is directed to an apparatus for neutron detection wherein neutrons are detected by measuring current pulses produced by interaction of neutrons with boron nitride. The invention has particular application to the detection of thermal neutrons.

Current neutron electronic detector systems rely principally on tubes filled with gases such as $^3$He and $BF_3$. These tubes are inefficient, bulky, fragile and complex to manufacture. Moreover, the low density of the gas phase is a major limitation on their use. Additionally, these prior art tubes have slow response times and are incapable of high resolution position sensing.

Generally, electronic detectors of nuclear radiation operate by exploiting the fact that incident radiation, by interaction in the detector volume, will create a charge pulse consisting of holes and electrons that can be separated under the influence of an electric field and the current detected by an external circuit. The conversion efficiency of solid state detectors is typically 100 to 1000 times greater than that of conventional gas-filled tubes consequently, solid state detectors are more sensitive than conventional gas-filled tubes. Moreover, solid state detectors are generally more compact, robust, and reliable than their gas-filled counterparts.

Newacheck et al. in U.S. Pat. No. 5,334,840 have shown that carbon infiltrated hexagonal boron nitride (hBN) can be used as a thermal neutron detector. The hexagonal boron nitride is used as a scintillator, to produce light in response to neutron conversion. The light is then detected in a secondary process, such as by exposing a photographic emulsion, or electronically with a photomultiplier or some other photon detection device. While this approach can be very efficient, timing and discrimination against gamma rays are poor. Moreover, detection relies on secondary means for detection rather than by a more efficient direct process.

SUMMARY OF THE INVENTION

Accordingly, the present invention provides for direct detection of neutrons by measuring the current produced when neutrons interact with hexagonal born nitride (hBN).

DETAILED DESCRIPTION OF THE INVENTION

The present invention is directed to an apparatus for the direct detection of neutrons and particularly thermal neutrons. The apparatus operates on the principle that an incident neutron is converted into energetic charged particles within a solid ionizable medium such as hexagonal boron nitride (hBN). The resulting ionization is sensed by direct collection of the charge carriers in the medium.

Figure 1:
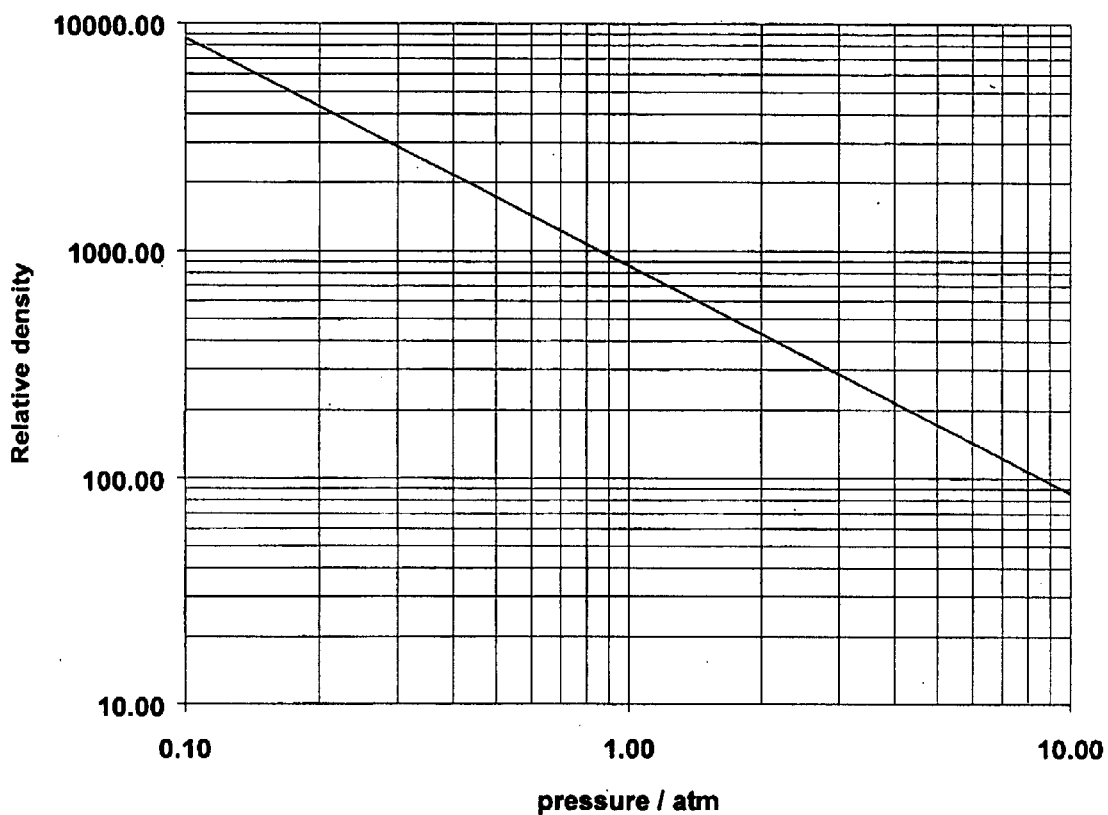
FIG. 1 compares the density of conversion atoms in solid hBN versus gas-filled tubes illustrating the improvement in sensitivity achieved by substituting a solid conversion medium for a high pressure gas.

FIG. 1 illustrates the improvement in efficiency provided by the invention over available electronic detectors such as $BF_3$ and $^3$He gas filled tubes. The density of neutron converting $^{10}$B atoms in hBN is greater by a factor of 100 to 1000 compared to typical high-pressure $^3$He tubes, or typical $BF_3$ tubes operating below atmospheric pressures.

Figure 2:
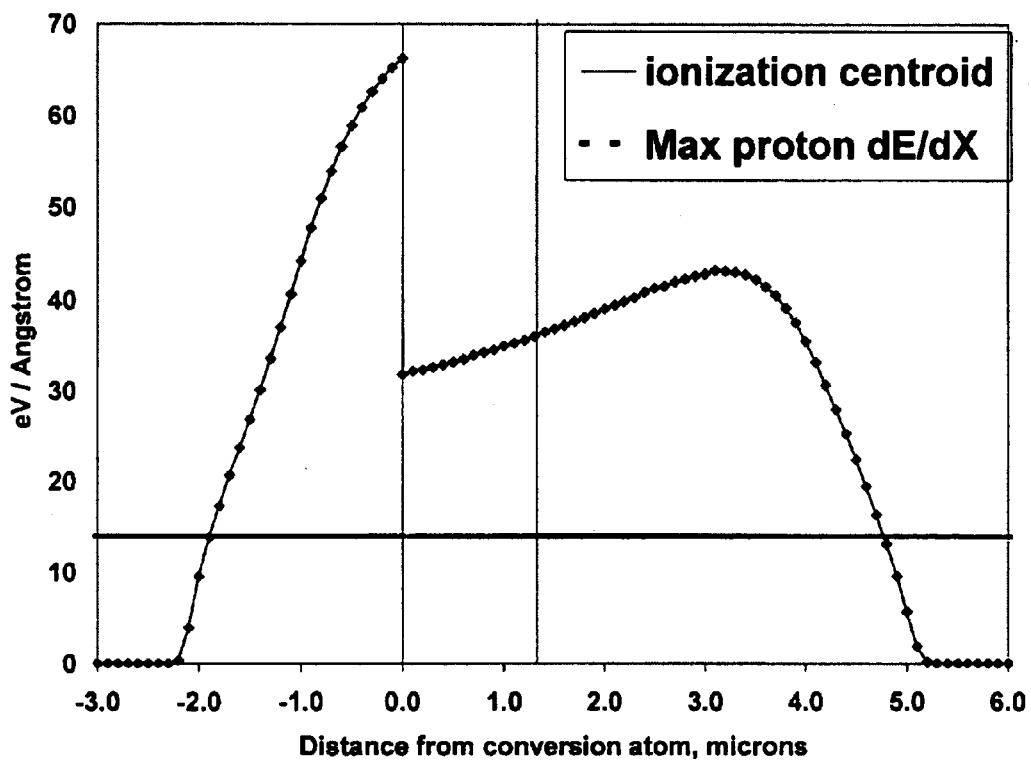
FIG. 2 shows the ionization profile for thermal neutron conversion in hBN.

Neutrons interacting in the solid are absorbed by $^{10}$B atoms, causing a nuclear reaction liberating 2.3 to 2.8 MeV of energy in the form of kinetic energy of the reaction products, $^7$Li and $^4$He. These particles ionize the surrounding material, resulting in free charge carriers distributed about the converting atom as seen in FIG. 2. The asymmetric bimodal distribution is caused by the two dissimilar mass particles ($^7$Li and $^4$He) traveling in opposite directions to conserve momentum. The more massive lithium ion produces the peak on the left, while the $^4$He particles produce the peak on the right. As seen in FIG. 2, the centroid of ionized charge is distributed within a few microns of the converting atom, enabling position sensitive detection with very high spatial resolution in contrast to prior art devices. For example, the centroid of the charges is displaced only 1.2 microns from the converting atom, making 2.4 micron spatial resolution possible in principle. In comparison, ionized charge distributions in prior art neutron gas detectors typically span millimeters.

The result of neutron interaction described above is a detectable current pulse. In the invention, the ionizable medium is hexagonal boron nitride (hBN), and preferably pyrolytic hexagonal boron nitride. The material of the present invention may be a single crystal, or it may be disordered. For example, the material may be a polycrystalline aggregate or a layered structure, refer to as "tubrostratic," which exhibits long range crystallographic order in that the hexagonal crystallographic c axis in each layer is generally aligned in a common direction. Current pulses produced by conversion of the incident neutrons to energetic charged particles are detected by applying an electric field to the body of the hBN detector in a direction about perpendicular to the crystallographic c axis.

Figure 3:
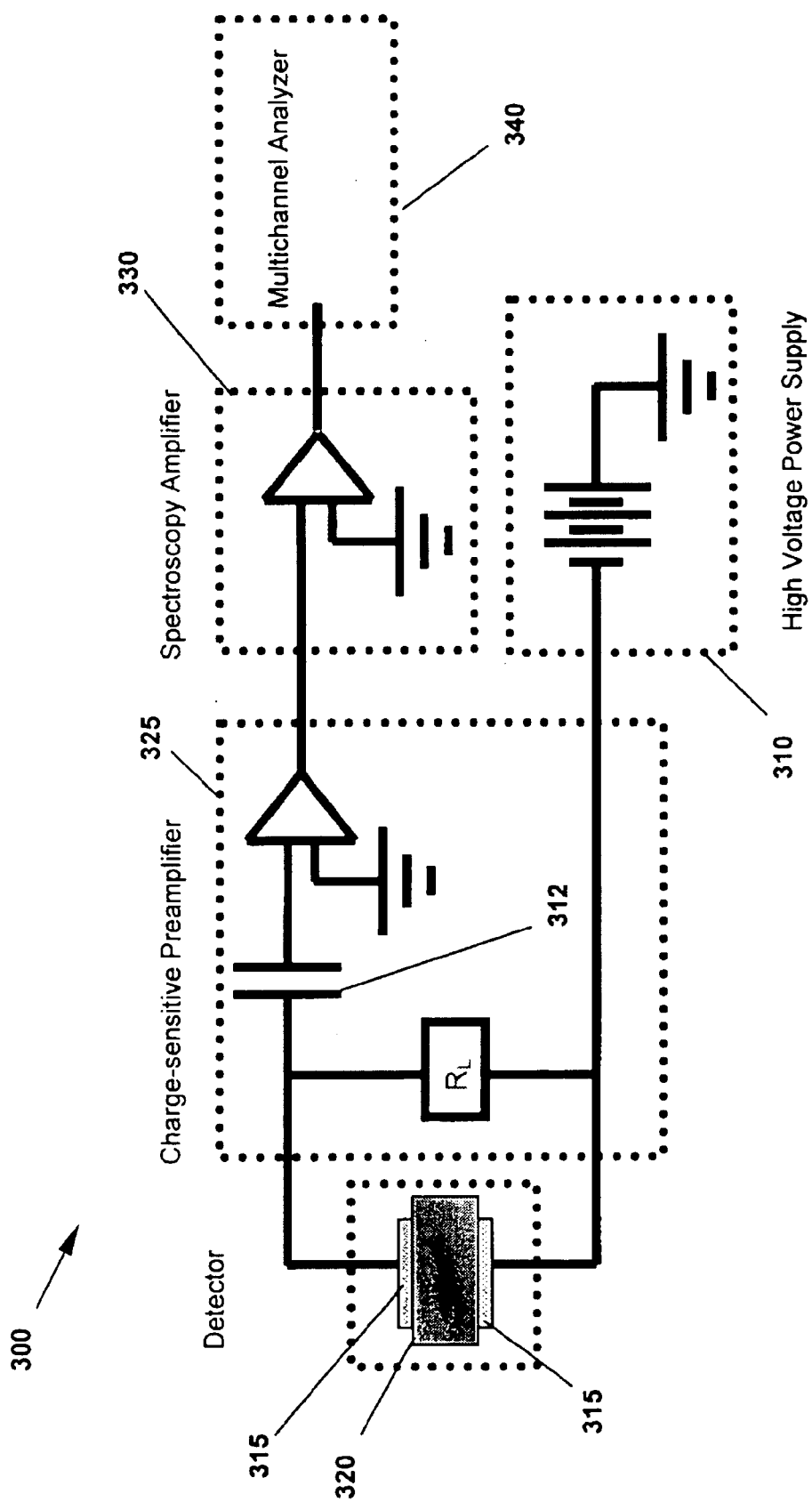
FIG. 3 illustrates a typical measurement circuit for converting neutrons to an electronic signal.

A typical measurement circuit 300 that can be used for detecting a neutron conversion event as described above is shown in FIG. 3. In this circuit a voltage from a power supply means 310 is applied across hBN material 320 by electrodes 315. Carriers created by the neutron conversion event are drifted some distance within the hBN material 320, resulting in a fast current pulse. The current is integrated across capacitor 312 in charge sensitive preamplifier 325. This step-function pulse is then amplified and shaped by spectroscopy amplifier 330 to reduce noise and false triggering of measurement circuit 300. This shaped pulse is then used to trigger a signal measuring means 340, such as an oscilloscope (not shown) or some other measurement or recording device, such as a multichannel analyzer.

Figure 4:
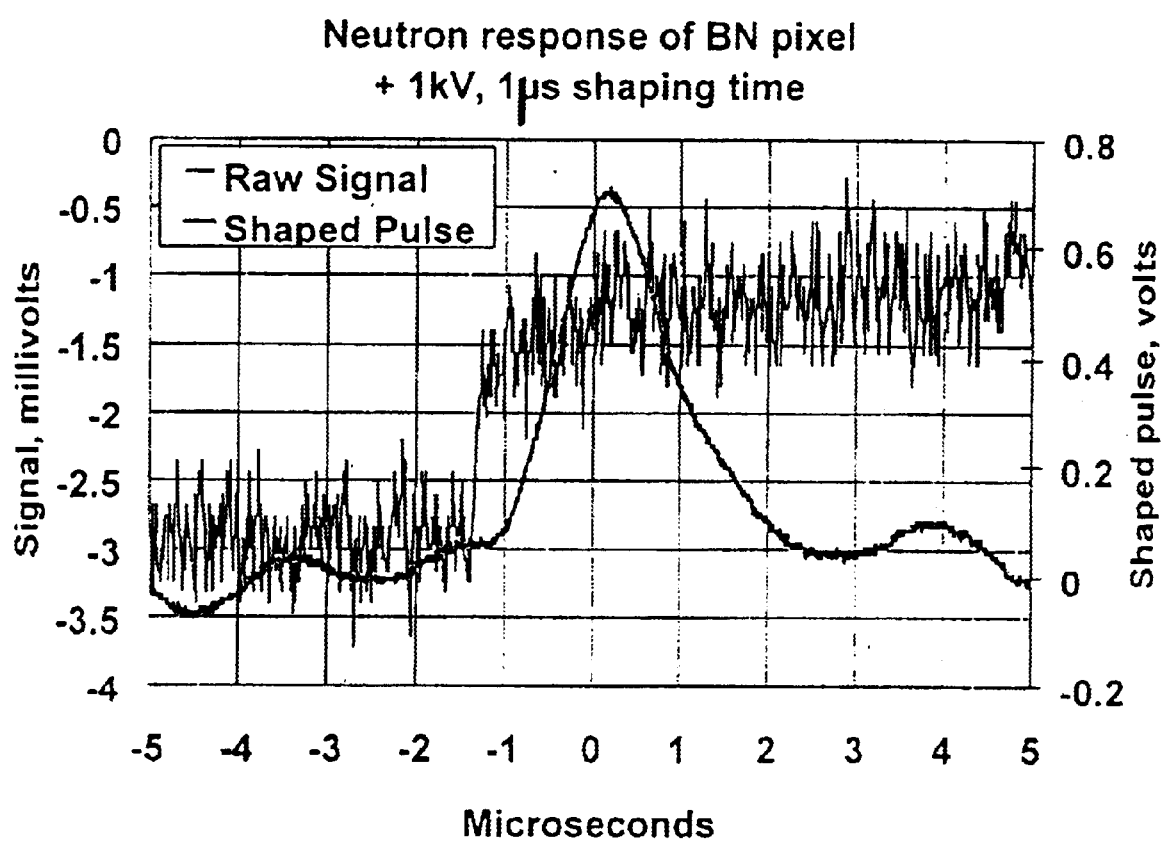
FIG. 4 shows typical neutron response waveforms obtained from the circuit of FIG. 3.

The measurement circuit described above was used to study hBN exposed to various forms of radiation. A body of hBN 320 disposed between electrodes 315 was exposed to a thermal neutron flux of about $7 \times 10^5$ n/cm$^2$/s from a nuclear reactor. The body of hBN was about 0.35 mm thick and about 2 mm on a side. A voltage of about 1 kV was applied to the electrodes disposed about perpendicular to the c axis of the hBN body by power supply means 310 and a signal of about 2 mV was detected and measured by associated signal measuring means 340, described above. Typical pulse results captured using a digital oscilloscope are shown in FIG. 4. The hBN material exhibited a rise time of less than about 100 ns. It will be appreciated by those skilled in the art, that rise times of this magnitude enable counting rates greater than about $10^6$ counts/sec. and timing resolution of less than about 10 ns. In comparison, conventional $^3$He detectors generally exhibit 1 μs timing and count rates of $10^5$ counts/sec.

Figure 5:
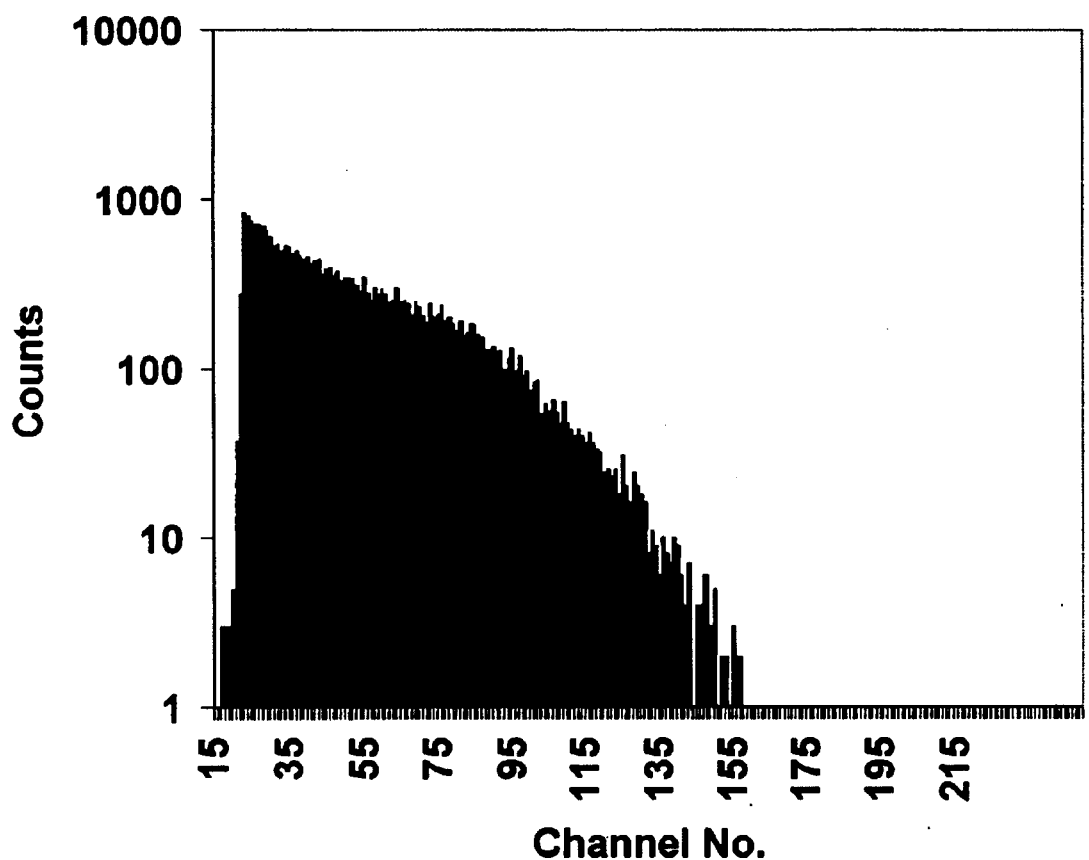
FIG. 5 is a pulse height histogram in a thermal neutron flux $7 \times 10^5$ n/cm$^2$/s for thermal neutron conversions in hBN.

The pulse height distribution recorded for this experiment is seen in FIG. 5. A count rate of about $10^2$ counts/sec. was observed in this experiment. However, when a boron shutter was interposed between the reactor and the hBN neutron detector device the count rate dropped to virtually zero. These results show that the device is sensitive to thermal neutrons, but is insensitive to the gamma radiation produced by the reactor. The estimated quantum efficiency of this device, made from natural hBN, was about 8%. The estimated efficiency for a similar device made from boron enriched to a level of 100% with the isotope $^{10}$B should be about 44%, comparable to the best $^3$He gas tubes.

Figure 6:
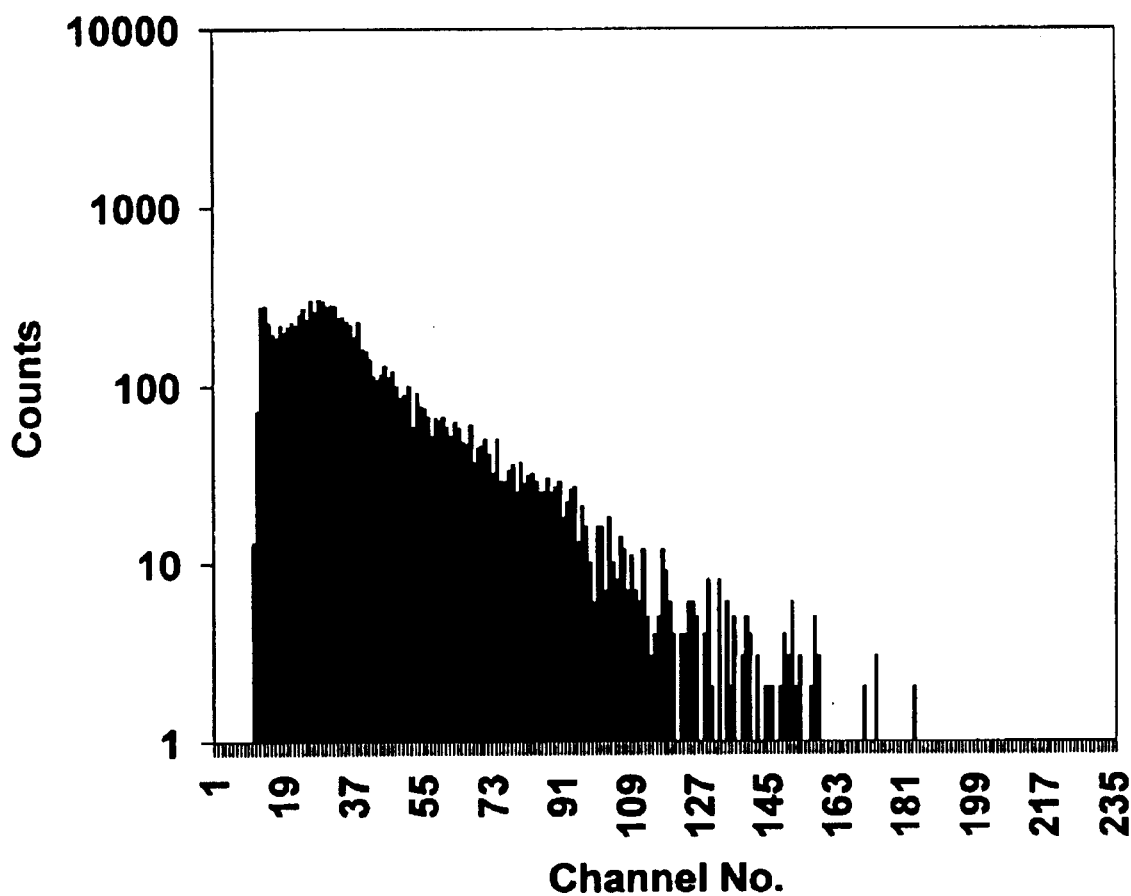
FIG. 6 is a pulse height histogram for $^{241}$Am alpha particles in hBN.

FIG. 6 shows a similar pulse height spectrum taken with the device of the present invention during exposure to alpha particles from an isotopic source. An important new feature emerges from the data when the two spectra shown in FIGS. 5 and 6, are compared. Whereas the isotopic alpha particles have approximately twice the energy of the conversion products (5.4 MeV versus 2.8 MeV), the pulses produced are similar in magnitude. These results show that ionization from neutron reaction products ($^7$Li and $^4$He) produce signals in the device more effectively than alpha particles ($^4$He) alone.

Additional testing was done with 3.4 MeV protons ($^1$H) from an accelerator. When these protons were directed on the device of FIG. 3, no detectable signal was produced. In consideration of the above results, it is clear that both the energy deposited (E) and the rate of energy deposition (dE/dx) are important in generating a signal in the device of the invention. Therefore, the insensitivity to gamma radiation from the nuclear reactor is due not only to the low atomic numbers of the constituents of the hBN, but to the existence of a dE/dx threshold. This threshold is between the maximum dE/dx for a proton ($^1$H) and that of an alpha particle ($^4$He). The lower bound for this threshold is about 12 eV/Angstrom, and is indicated as a horizontal line in FIG. 2.

It should be noted that this effect can be attributed to the existence of a high density of trap states in the material. These traps act to immobilize charge carriers, removing them from the signal. Lower mass particles, such as photoelectrons and protons, generate lower concentrations of mobile charge carriers. These carriers are quickly trapped, effectively eliminating the signal. Higher mass particles such as helium and lithium ions interact more strongly in the material, producing concentrations of mobile carriers far in excess of the trap density. The carriers therefore saturate the traps and generate detectable current pulses.

This trapping results in a threshold effect, which can be used to discriminate between particles strictly according to their masses. Many materials could be modified to introduce such a threshold. Semiconductors including silicon, germanium, gallium arsenide, and cadmium telluride exhibit trapping in varying degrees caused by intrinsic and extrinsic defects (e.g. vacancies or impurity atoms) and by extended defects such as stacking faults and dislocations. Certain polymers can also behave in this way (e.g. poly(3-octylthiophene), poly(2,5-dioctyloxy-p-phenylenevinylene) (DPOOPPV) and poly(1-methoxy-4-(2-ethylhexyloxy)-2,5-phenylenevinylene) (MEHPPV)). It is reasonable to expect that a dE/dx threshold could be induced in these materials by introducing high concentrations of the above defects. It is also reasonable to extend this effect to scintillators, which rely on the same mobile charge carriers to diffuse and recombine at centers distributed in the material. Examples include cesium iodide, sodium iodide and anthracene.

I claim:

1. A device for detecting neutrons, comprising:

a body of hexagonal boron nitride disposed between electrodes;

power supply means for applying a voltage to the electrodes, wherein the voltage is applied in a direction substantially parallel to a crystallographic axis of the hexagonal boron nitride; and means for detecting and measuring the current pulse emitted from said hexagonal boron nitride.

2. The device of claim 1, wherein the hexagonal boron nitride is pyrolytic hexagonal boron nitride.

3. The device of claim 1, wherein the hexagonal boron nitride is enriched with the isotope $^{10}$B.

4. The device of claim 3, wherein the enrichment is 100%.

5. The device of claim 1, wherein said hexagonal boron nitride comprises a structure selected from the group consisting of single crystal, polycrystalline, turbostratic, and disordered.

6. The device of claim 1, wherein the crystallographic axis is the c-axis.

7. The device of claim 1, wherein a signal is generated when the rate of energy deposition is greater than about 12 eV/Angstrom.

8. A method for detecting neutrons, comprising:

providing a body of hexagonal boron nitride disposed between electrodes, wherein the electrodes are disposed perpendicular to a crystallographic axis of the hexagonal boron nitride;

applying an electric field parallel to a crystallographic axis of the hexagonal boron nitride;

exposing the hexagonal boron nitride to a flux of neutrons; and measuring the current pulse produced.

9. The method of claim 8, wherein the hexagonal boron nitride is pyrolytic hexagonal boron nitride.

10. The method of claim 8, wherein the crystallographic axis is the c-axis.

* * * * *